United States Patent
Patwardhan et al.

(10) Patent No.: US 10,379,962 B1
(45) Date of Patent: Aug. 13, 2019

(54) DE-DUPLICATING BACKUP FILES BASED ON DATA EVOLUTION

(71) Applicant: EMC IP Holding Company LLC, Hopkinton, MA (US)

(72) Inventors: Kedar Patwardhan, Irvine, CA (US); Arash Sepasi Ahoei, Irvine, CA (US); Mathew Sprehn, Irvine, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 361 days.

(21) Appl. No.: 15/283,550

(22) Filed: Oct. 3, 2016

(51) Int. Cl.
*G06F 7/00* (2006.01)
*G06F 17/00* (2019.01)
*G06F 11/14* (2006.01)
*G06F 16/174* (2019.01)

(52) U.S. Cl.
CPC ...... *G06F 11/1453* (2013.01); *G06F 11/1464* (2013.01); *G06F 16/1748* (2019.01); *G06F 2201/84* (2013.01)

(58) Field of Classification Search
CPC ............ G06F 11/1453; G06F 11/1464; G06F 16/1748; G06F 2201/84
See application file for complete search history.

(56) References Cited

U.S. PATENT DOCUMENTS

| | | | |
|---|---|---|---|
| 7,797,297 B2* | 9/2010 | Starling | G06F 21/6218 707/641 |
| 2011/0082841 A1* | 4/2011 | Christiaens | G06F 11/1453 707/692 |
| 2012/0166401 A1* | 6/2012 | Li | G06F 17/3033 707/692 |

* cited by examiner

*Primary Examiner* — Azam M Cheema
(74) *Attorney, Agent, or Firm* — Dergosits & Noah LLP; Todd A. Noah

(57) ABSTRACT

De-duplicating backup files based on data evolution is described. A system determines that a first backup file is created for a first data object, determines that the first data object is based on a second data object, and de-duplicates the first backup file based on a second backup file that was created for the second data object. The system determines that a third backup file is created for a third data object, determines that the third data object is based on the second data object, and de-duplicates the third backup file based on the second backup file that was created for the second data object.

20 Claims, 4 Drawing Sheets

DE-DUPLICATING BACKUP FILES BASED ON DATA EVOLUTION

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object. When a backup/restore application creates an incremental backup file for a data object, the backup/restore application only backs up data that is new or changed in the data object since the backup/restore application created the most recent previous backup file. The backup/restore application identifies the most recently created backup file to enable the combination of the incremental backup file and the most recently created backup file, possibly along with other backup files created for the data object, into a full copy of the backed up data object.

A data object can be a collection or a group of information that is backed up as a unit, such as the information for a computer or a network of computers. A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create backups files of data objects and store the backup files of data objects on multiple storage arrays.

DETAILED DESCRIPTION

Figure 1:
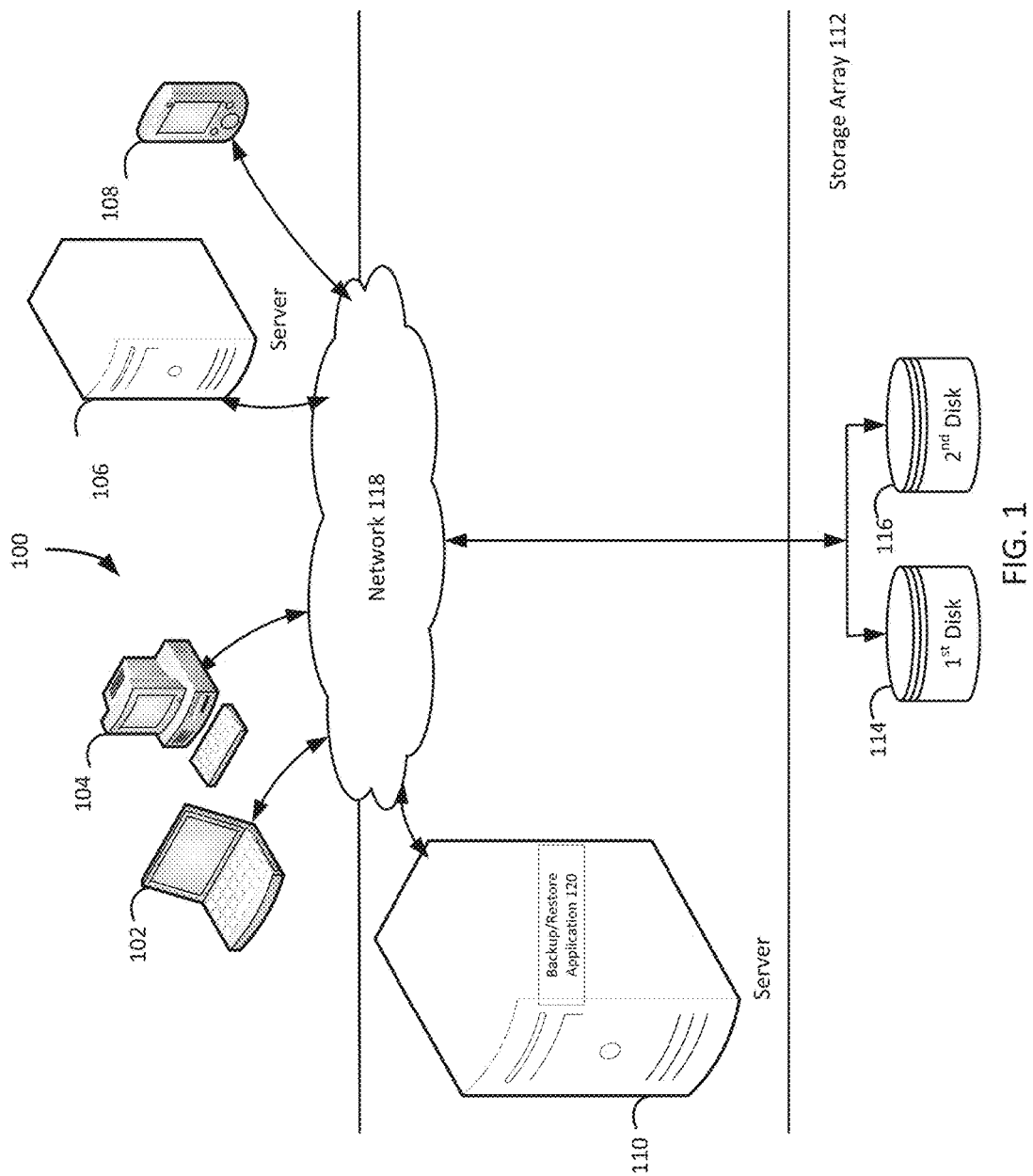
FIG. 1 illustrates a block diagram of an example system for de-duplicating backup files based on data evolution, under an embodiment.

A rift exists between data management technologies and the way that data users actually conceptualize and utilize their data. Typical data management technologies treat data as the contents of a data host, such as a client or a database server, and therefore organize their management of this data at the level of that data host, such as allocating one backup account per client. Even if a typical data management technology relates data together based on the data host in order to achieve better de-duplication, the typical data management technology still manages the data at the data host level, and not at the data level. An end user may view their data as an entity all its own, as a means to an end, and independent of the data host with which the typical data management technologies identifies the end user's data. The evolution of the end user's data occurs as a result of the inherent utility of that data, and ultimately not because of the data host that transforms the end user's data. For example, a database's content evolves over time regardless of which server hosts the database or what technology implements the database. Since typical data management technologies limit the data to the scope of its data host, the management of data has become a management of data hosts, such as clients, and the data itself evolves within that data host. This scope results in challenges when an end user evolves their data beyond the confines of the original data host. An end user can configure a fundamental data template, and then evolve this data in different ways within different clients. Typical data management technologies would require the user to backup such evolving data separately for each of the clients, even though initially all of the clients contain identical data, thereby resulting in many backup files that contain duplicates of the same data. For example, an information technology administrator creates a template of a virtual machine for their department to use, a typical data management technology creates a separate backup file for each virtual machine cloned from this template, and the resulting backup files contain many duplicates of that original virtual machine template's data.

Embodiments herein de-duplicate backup files based on data evolution. A system determines that a first backup file is created for a first data object, determines that the first data object is based on a second data object, and de-duplicates the first backup file based on a second backup file that was created for the second data object. The system determines that a third backup file is created for a third data object, determines that the third data object is also based on the same second data object, and de-duplicates the third backup file based on the same second backup file that was created for the second data object.

For example, a backup/restore application determines that a backup file is created for an eastern contacts database hosted by an eastern laptop computer, determines that the eastern contacts database evolved from an original contacts database hosted by a central server, and de-duplicates the eastern contacts database's backup file based on the backup file for the original contacts database. Then the backup/restore application determines that a backup file is created for an western contacts database hosted by a western desktop computer, determines that the western contacts database also evolved from the same original contacts database, and de-duplicates the western contacts database's backup file based on the same backup file for the original contacts database. Even though all three contacts databases are hosted by different data hosts, the backup/restore application efficiently de-duplicates the backup files of the eastern and western contacts databases based upon the evolution of the eastern and western contacts databases from the original contacts database.

FIG. 1 illustrates a diagram of a system 100 for de-duplicating backup files based on data evolution, under an embodiment. As shown in FIG. 1, the system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, a third client 106, and a fourth client 108; and a server 110, and a storage array 112 that may be provided by a hosting company. Although FIG. 1 depicts the first client 102 as a laptop computer 102, the second client 104 as a personal computer 104, the third client 106 as a server 106, and the fourth client 108 as a personal digital assistant 108, each of the clients 102-108 may be any type of computer. The storage array 112 includes a first disk 114 and a second disk 116. The clients 102-108, the server 110, and the storage array 112 communicate via a network 118. Although FIG. 1 depicts the system 100 with four clients 102-108, one server 110, one storage array 112, two disks 114-116, and one network 118, the system 100 may include any number of clients 102-108, any number of servers 110, any number of storage arrays 112, any number of disks 114-116, and any number of networks 118. The clients 102-108 and the server 110 may each be substantially similar to the system 400 depicted in FIG. 4 and described below.

The server 110, which may be referred to as a backup server 110, includes a backup/restore application 120 that may create backup files of data objects for the clients 102-108, and execute a rollback based on the backup files stored on the storage array 112, which may be stored using the VHDx format for Microsoft Windows®. The backup/restore application 120 may provide centralized administration, such as scheduling, monitoring, and managing backup operations and backup files. The backup/restore application 120 can enable the storing of backup operation schedules, client policies, and client configurations. The backup/restore application 120 may provide a unique interface to the clients 102-108 during login, and assist the backup server 110 in authenticating and registering the clients 102-108. The backup/restore application 120 can send backup/restore work orders to the clients 102-108, which may receive and process the work orders to start a backup or restore operation. The backup/restore application 120 maintains a local database of all processes that execute on the backup server 110. The backup/restore application 120 executes server-side processes for a system administrator's graphical management console, which may enable the system administrator to use command line interface tools for queries. For example, a system administrator identifies the clients 102-108 registered with the backup server 110.

Although FIG. 1 depicts the backup/restore application 120 residing completely on the backup server 110, the backup/restore application 120 may reside in any combination of partially on the backup server 110 and partially on the clients 102-108, such as by residing as data management applications on the clients 102-108. Even though the following paragraphs describe EMC Corporation's Avamar® backup/restore application and EMC Corporation's NetWorker® backup/restore application as examples of the backup/restore application 120, the backup/restore application 120 may be any other backup/restore application which provides the backup/restore functionalities described in the Background section.

The backup/restore application 120 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 120 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

Figure 2:
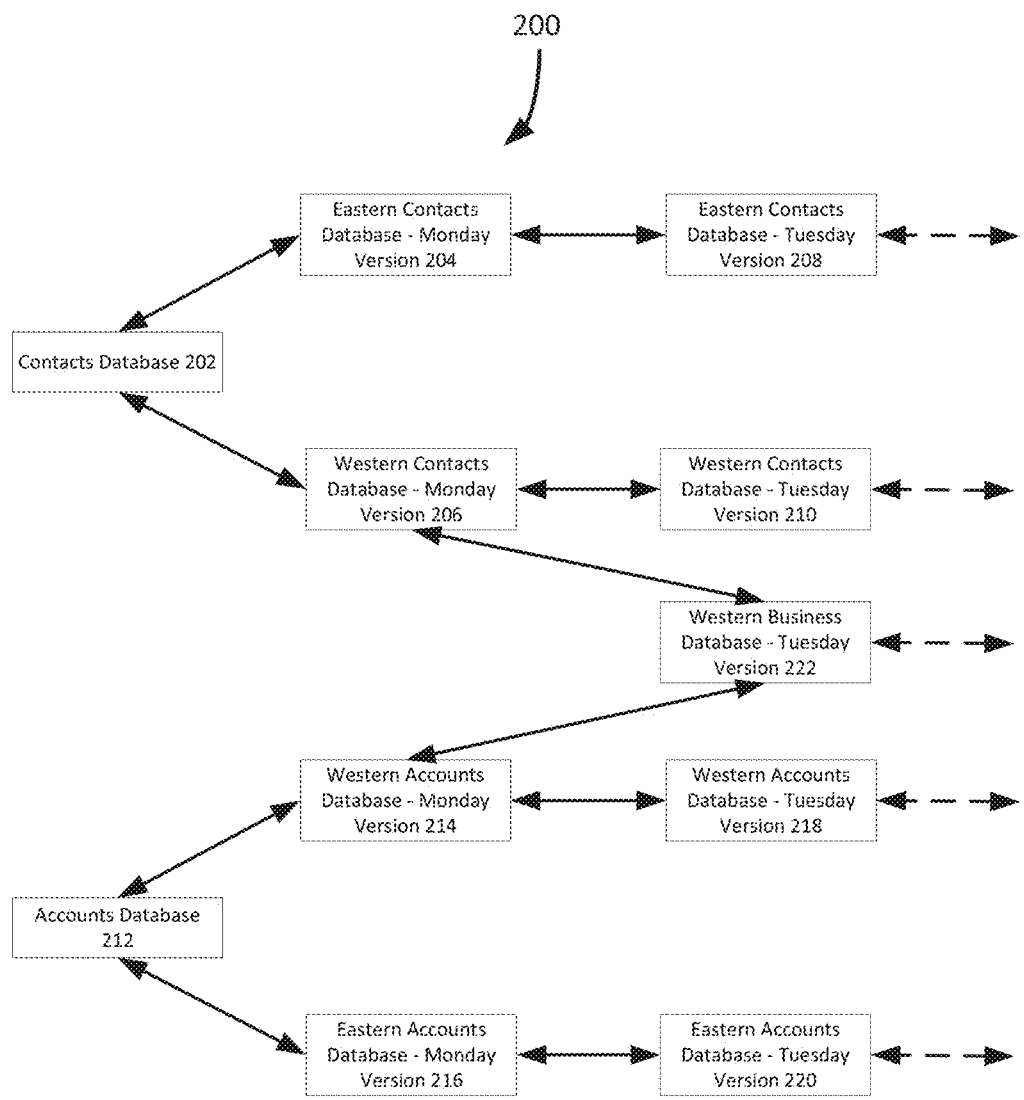
FIG. 2 illustrates a block diagram of example data evolution structure for de-duplicating backup files based on data evolution, under an embodiment.

The following descriptions of de-duplicating backup files based on data evolution use the example of Acme Corporation dividing a contacts database 202 into an eastern contacts database 204 and a western contacts database 206, evolving the contacts databases 204-206 into contacts databases 208-210, dividing an accounts database 212 into a western accounts database 214 and an eastern accounts database 216, and evolving the accounts databases 214-216 into accounts databases 218-220, as depicted in FIG. 2. Although these examples describe the evolution of a data object into two data objects that evolve in parallel, an eastern database and a western database, the system 100 can de-duplicate backup files based on a data object evolving into any number of data objects that evolve in parallel. Acme Corporation initially uses the central server 106 to host the contacts database 202 to enable representatives working at a customer service center to contact potential customers listed in the contacts database 202. Then Acme Corporation divides the customer service center into two customer service centers: an eastern customer service center to contact potential customers in the eastern time zone and the central time zone, and a western customer service center to contact potential customers in the mountain time zone and the pacific time zone. On Sunday July 31$^{st}$, when representatives are no longer modifying the contacts database 202 at the original customer service center, an information technology administrator creates a full backup file for the contacts database 202. A full backup file for a data object can be a record of all the information needed to restore the data object to a state at a point in time when the information was recorded. Then the information technology administrator divides the contacts database 202 into the eastern contacts database 204, which is hosted by the eastern laptop computer 102 at the eastern customer service center, and the western contacts database 206, which is hosted by the western desktop computer 104 at the western customer service center. At midnight on Monday August 1$^{st}$, after the representatives working at the eastern and western customer service centers are finished modifying their respective contacts databases 204-206 for the day, the backup/restore application 120 creates incremental backup files for these contacts databases 204-206. An incremental backup file for a data object can be a record of the data that is new or changed in the data object since a backup/restore application created the most recent previous backup file.

Having created a backup file, the system 100 determines that the backup file is created for a data object, as the backup file's de-duplication is based on the data object for which the backup file is created. For example and without limitation, this can include the backup/restore application 120 determining that an incremental backup file is created at midnight on Monday August 1$^{st}$ for the eastern contacts database—Monday version 204 that is hosted by the eastern laptop computer 102. Although examples describe data evolution and the creation of corresponding backup files that occurs on a daily basis, the basis for data evolution and the creation of corresponding backup files can be any time period, such as seconds, minutes, hours, days, weeks, months, or years. A backup file created for a data object can be a full backup file or an incremental backup file that records all or some of the information needed to restore the data object to a state at a point in time when the information was recorded.

The system 100 tracks data evolution by determining that a data object is based on another data object, such that the data evolution is a basis for de-duplicating a corresponding backup file. By way of example and without limitation, this can include the backup/restore application 120 determining that the eastern contacts database—Monday version 204 evolved from the contacts database 202 that is hosted by the central server 106. One data object can be based on another data object if the data object is a newer version of the other data object, is a variation of the other data object, is a composite of the other data object, is a constituent of the other data object, or is a subset of the other data object. The backup/restore application 120 can determine that one data object is based on another data object by analyzing the data object's backup file and/or by receiving information associating the data object with the other data object. For example, the information technology administrator sends information to the backup/restore application 120 which specifies that the contacts database 202 is divided to create the contacts databases 204-206.

In an alternative example, the incremental backup file for the eastern contacts database—Monday version 204 includes information specifying that this incremental backup file is created for a database with a Globally Unique Identifier (GUID), and the full backup file for the contacts database 202 includes information specifying that this full backup file was created for a database with the same Globally Unique Identifier. Used within this context, these Globally Unique Identifiers are not unique within the network of data hosts, but these Globally Unique Identifiers are still unique within each individual data host. A data host can host and evolve multiple data objects simultaneously, but hosts at most one data object for each specific Globally Unique Identifier. Therefore, the backup/restore application 120 can analyze the Globally Unique Identifier in the backup file to determine that the eastern contacts database—Monday version 204 evolved from the contacts database 202.

After the system 100 determines that a data object is based on another data object, the system 100 can create a link from the data object to the other data object in a data evolution structure. The system 100 can de-duplicate a backup file based on a link from one data object to another data object. In embodiments, this can include the backup/restore application 120 creating a link from the eastern contacts database—Monday version 204 to the contacts database 202, as depicted in FIG. 2, because the eastern contacts database—Monday version 204 evolved from the contacts database 202. Linking one data object to another data object can be making or forming a connection or relationship between the data objects. A link between one data object and another data object can be the connection or relationship between the data objects.

Once the evolution of a data object is tracked, the system 100 de-duplicates the data object's backup file based on another backup file that was created for another data object. For example and without limitation, this can include the backup/restore application 120 de-duplicating the incremental backup file created at midnight on Monday August 1$^{st}$ for the eastern contacts database—Monday version 204 based on the full backup file for the contacts database 202 because the eastern contacts database—Monday version 204 is linked to the contacts database 202 in the data evolution tree 200. De-duplicating can be a specialized data compression process for eliminating many identical copies of repeating data. In the deduplication process, unique chunks of data are identified and stored during analysis. As the analysis continues, other chunks are compared to the already stored chunks of data, and whenever a match occurs, the redundant chunk is replaced with a small reference that points to the already stored chunk that matches. De-duplicating a backup file based on another backup file can be using the backup data in the other backup file as the already stored chunks of data during the de-duplication process.

Next, the system 100 determines that an additional backup file is created for an additional data object, and that the additional data object is also based on the other data object. The additional backup file's de-duplication is based on the additional backup file for the additional data object. By way of example and without limitation, this can include the backup/restore application 120 determining that an incremental backup file is created at midnight on Monday August 1$^{st}$ for the western contacts database—Monday version 206 that is hosted by the western desktop computer 104, and that the western contacts database—Monday version 206 also evolved from the contacts database 202 that is hosted by the central server 106. Consequently, the system 100 de-duplicates the additional backup file based on the other backup file that was created for the other data object. In embodiments, this can include the backup/restore application 120 de-duplicating the incremental backup file created at midnight on Monday August 1$^{st}$ for the western contacts database—Monday version 206 based on the full backup file for the contacts database 202 because the western contacts database—Monday version 206 is linked to the contacts database 202 in the data evolution tree 200. Even though all three contacts databases 202-206 are hosted by different data hosts 102-106, the backup/restore application 120 efficiently de-duplicates the incremental backup files of the eastern and western contacts databases 204-206 based upon the evolution of the eastern and western contacts databases 204-206 from the original contacts database 202.

In contrast, since a typical backup/restore application manages data based on the data host that hosts the data, and since the incremental backup files of the eastern and western contacts databases 204-206 were the initial backup files created for the data hosts 102-104, a typical backup/restore application may not even attempt to de-duplicate any of the data in these incremental backup files that includes many duplicates of the data that is in the full backup file for the contacts database 202. The contrast between the backup/restore application 120 and a typical backup/restore application can become even more pronounced when virtual machines host the data. For example, an Acme Corporation server spawns virtual machines to host the contacts databases 204-206 each day, and deletes these virtual machines each night after prolonged inactivity, such that one specific virtual machine hosts the eastern contacts database 204 on Monday, hosts the western contacts database 206 on Tuesday, and hosts a different database on Wednesday. Consequently, a typical backup/restore application, which focuses on the data host instead of the data itself, may face significant challenges when attempting to de-duplicate the daily backup files for such a virtual machine. However, the backup/restore application 120, which focuses on the data itself instead of the data host, would efficiently de-duplicate the backup file created each night for such a virtual machine.

In addition to creating new links between data objects and using these newly created links to de-duplicate backup files, the system 100 can use previously created links between data objects to de-duplicate backup files. The system 100 can determine that a backup file is created for a data object, determine that the data object is based on another data object, and de-duplicate the backup file based on another backup file that was created for the other data object and an additional backup file that was created for an additional data object. In embodiments, this can include the backup/restore application 120 determining that an incremental backup file is created at midnight on Tuesday August $2^{nd}$ for the eastern contacts database—Tuesday version 208 that is hosted by the eastern laptop computer 102, and determining that the eastern contacts database—Tuesday version 208 evolved from the eastern contacts database—Monday version 204 that is also hosted by the eastern laptop computer 102. In addition to creating a new link between the eastern contacts databases 204 and 208 for de-duplicating the incremental backup file created at midnight on Tuesday August $2^{nd}$ for the eastern contacts database—Tuesday version 208, the backup/restore application 120 can also use the previously created link between the contacts databases 202 and 204 to de-duplicate this incremental backup file. Therefore, the backup/restore application 120 can de-duplicate the incremental backup file created at midnight on Tuesday August $2^{nd}$ for the eastern contacts database—Tuesday version 208 based on the incremental backup file created at midnight on Monday August $1^{st}$ for the eastern contacts database—Monday version 204 and the full backup file for the contacts database 202.

Similarly, for example and without limitation, this can include the backup/restore application 120 determining that an incremental backup file is created at midnight on Tuesday August $2^{nd}$ for the western contacts database—Tuesday version 210 that is hosted by the western desktop computer 104, and determining that the western contacts database—Tuesday version 210 evolved from the western contacts database—Monday version 206. In addition to creating a new link between the western contacts databases 206 and 210 for de-duplicating the incremental backup file created at midnight on Tuesday August $2^{nd}$ for the western contacts database—Tuesday version 210, the backup/restore application 120 can also use the previously created link between the contacts databases 202 and 206 to de-duplicate this incremental backup file. Therefore, the backup/restore application 120 can de-duplicate the incremental backup file created at midnight on Tuesday August $2^{nd}$ for the western contacts database—Tuesday version 210 based on the incremental backup file created at midnight on Monday August $1^{st}$ for the western contacts database—Monday version 206 and the full backup file for the contacts database 202.

Although these examples describe the system 100 de-duplicating a backup file based on one newly created link and one previously created link, the system 100 can de-duplicate a backup file based on any number of newly created links and any number of previously created links. The following description of de-duplicating backup files based on data evolution uses the example of an Acme Corporation supervisor evolving both the western contacts database—Monday version 206 and the western accounts database—Monday version 214 into the western business database Tuesday version 222, so that the supervisor at the western customer service center can review the work of representatives working at the western customer service center.

The system 100 can determine that a backup file is created for a data object, and determine that the data object is based on two other data objects. By way of example and without limitation, this can include the backup/restore application 120 determining that an incremental backup file is created at midnight on Tuesday August $2^{nd}$ for the western business database—Tuesday version 222 that is hosted by the personal digital assistant 108, and determining that the western business database—Tuesday version 222 evolved from both the western contacts database—Monday version 206 that is hosted by the western desktop computer 104 and the western accounts database—Monday version 214.

The system 100 can de-duplicate a backup file for a data object based on another backup file that was created for another data object from which the data object evolved. The system 100 can also de-duplicate a backup file for a data object and based on an additional backup file that was created for an additional data object from which the data object evolved. A system user can create a new data object at any point in time after a backup file has been created for a data object from which the new data object is evolved. In embodiments, this can include the backup/restore application 120 de-duplicating the incremental backup file created at midnight on Tuesday August $2^{nd}$ for the western business database—Tuesday version 222 based on the incremental backup file created at midnight on Monday August $1^{st}$ for the western contacts database—Monday version 206, the full backup file for the contacts database 202. This de-duplication is also based on the incremental backup file created at midnight on Monday August $1^{st}$ for the western accounts database—Monday version 214, as well as any additional backup files that were created for databases from which the western accounts database—Monday version 214 evolved.

FIG. 2 illustrates a block diagram of example data evolution structure for de-duplicating backup files based on data evolution, under an embodiment. The backup/restore application 120 creates the data evolution tree 200 in response to Acme Corporation dividing the contacts database 202 into the contacts databases 204-206, evolving the contacts databases 204-206 into the contacts databases 208-210, dividing the accounts database 212 into the accounts databases 214-216, evolving the accounts databases 214-216 into the accounts databases 218-220, and evolving the Monday versions of the western databases 206 and 214 into the western business database—Tuesday version 222. Although FIG. 2 depicts a limited number of data evolutions, evolving the original databases 202 and 212 into the Monday databases 204-206 and 214-216, and then evolving the Monday databases 204-206 and 214-216 into the Tuesday databases 208-210 and 218-220, the backup/restore application 120 can create the data evolution tree 200 based on any number of data evolutions, as represented by the dashed arrows pointing to the right of FIG. 2.

Figure 3:
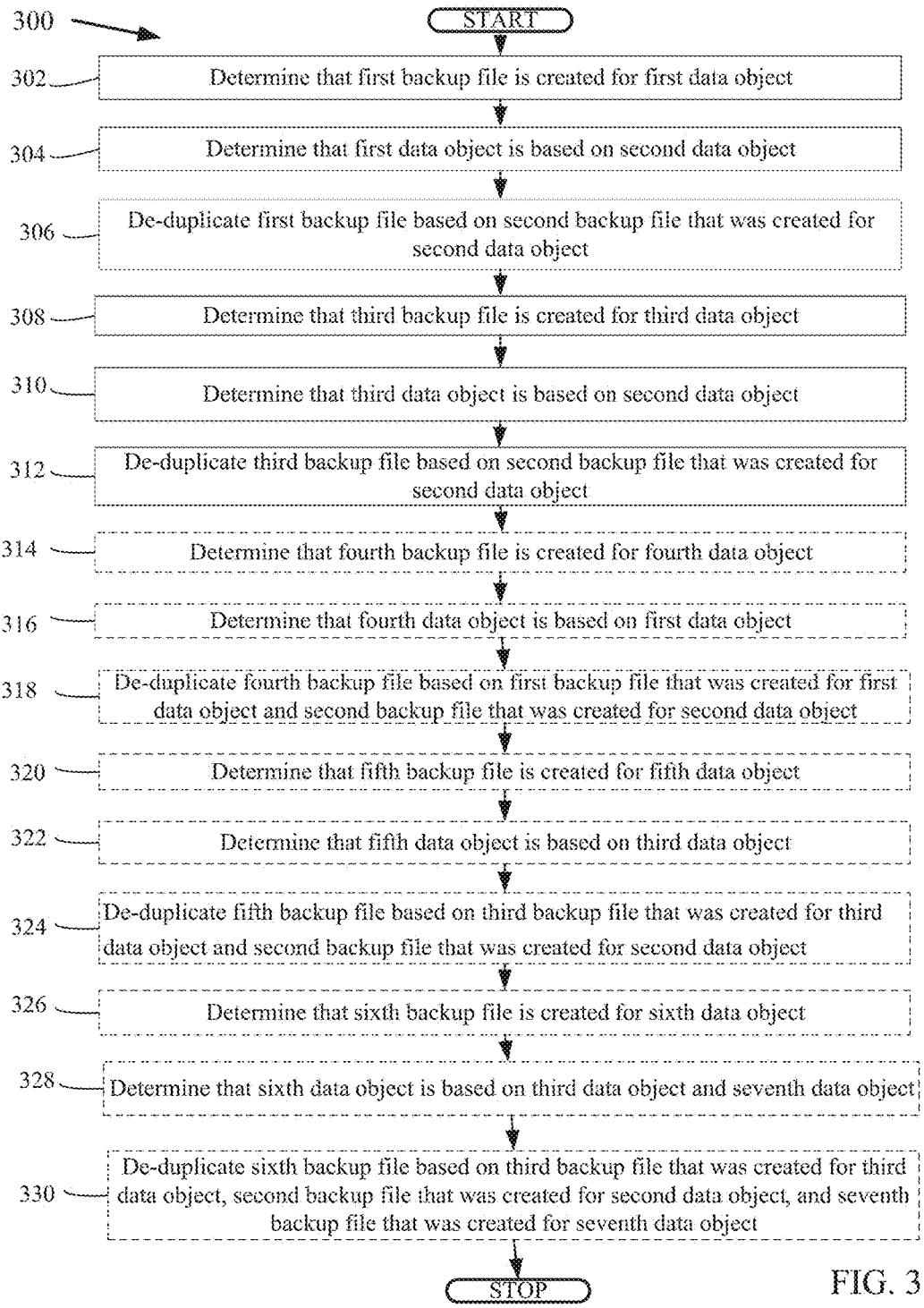
FIG. 3 is a flowchart that illustrates a method of de-duplicating backup files based on data evolution, under an embodiment.

FIG. 3 is a flowchart that illustrates a method for de-duplicating backup files based on data evolution, under an embodiment. Flowchart 300 illustrates method acts illustrated as flowchart blocks for certain steps involved in and/or between the clients 102-108 and/or the server 110 of FIG. 13 and also involving the data evolution tree 200 of FIG. 2.

A first backup file is determined to be created for a first data object, block 302. For example and without limitation, this can include the backup/restore application 120 determining that an incremental backup file is created at midnight on Monday August $1^{st}$ for the eastern contacts database—Monday version 204 that is hosted by the eastern laptop computer 102.

The first data object is determined to be based on a second data object, block 304. By way of example and without limitation, this can include the backup/restore application 120 determining that the eastern contacts database—Monday version 204 evolved from the contacts database 202 that is hosted by the central server 106.

The first backup file is de-duplicated based on a second backup file that was created for the second data object, block 306. In embodiments, this can include the backup/restore application 120 de-duplicating the incremental backup file created at midnight on Monday August $1^{st}$ for the eastern contacts database—Monday version 204 based on the full backup file for the contacts database 202.

A third backup file is determined to be created for a third data object, block 308. For example and without limitation, this can include the backup/restore application 120 determining that an incremental backup file is created at midnight on Monday August $1^{st}$ for the western contacts database—Monday version 206 that is hosted by the western desktop computer 104.

The third data object is determined to be based on the second data object, block 310. By way of example and without limitation, this can include the backup/restore application 120 determining that the western contacts database—Monday version 206 evolved from the contacts database 202 that is hosted by the central server 106.

The third backup file is de-duplicated based on the second backup file that was created for the second data object, block 312. In embodiments, this can include the backup/restore application 120 de-duplicating the incremental backup file created at midnight on Monday August $1^{st}$ for the western contacts database—Monday version 206 based on the full backup file for the contacts database 202.

A fourth backup file is optionally determined to be created for a fourth data object, block 314. For example and without limitation, this can include the backup/restore application 120 determining that an incremental backup file is created at midnight on Tuesday August $2^{nd}$ for the eastern contacts database—Tuesday version 208 that is hosted by the eastern laptop computer 102.

The fourth data object is optionally determined to be based on the first data object, block 316. By way of example and without limitation, this can include the backup/restore application 120 determining that the eastern contacts database—Tuesday version 208 evolved from the eastern contacts database—Monday version 204 that is hosted by the eastern laptop computer 102.

The fourth backup file is optionally de-duplicated based on the first backup file that was created for the first data object and the second backup file that was created for the second data object, block 318. In embodiments, this can include the backup/restore application 120 de-duplicating the incremental backup file created at midnight on Tuesday August $2^{nd}$ for the eastern contacts database—Tuesday version 208 based on the incremental backup file created at midnight on Monday August $1^{st}$ for the eastern contacts database—Monday version 204 and the full backup file for the contacts database 202.

A fifth backup file is optionally determined to be created for a fifth data object, block 320. For example and without limitation, this can include the backup/restore application 120 determining that an incremental backup file is created at midnight on Tuesday August $2^{nd}$ for the western contacts database—Tuesday version 210 that is hosted by the western desktop computer 104.

The fifth data object is optionally determined to be based on the third data object, block 322. By way of example and without limitation, this can include the backup/restore application 120 determining that the western contacts database—Tuesday version 210 evolved from the western contacts database—Monday version 206 that is hosted by the western desktop computer 104.

The fifth backup file is optionally de-duplicated based on the third backup file that was created for the third data object and the second backup file that was created for the second data object, block 324. In embodiments, this can include the backup/restore application 120 de-duplicating the incremental backup file created at midnight on Tuesday August $2^{nd}$ for the western contacts database—Tuesday version 210 based on the incremental backup file created at midnight on Monday August $1^{st}$ for the western contacts database—Monday version 206 and the full backup file for the contacts database 202.

A sixth backup file is optionally determined to be created for a sixth data object, block 326. For example and without limitation, this can include the backup/restore application 120 determining that an incremental backup file is created at midnight on Tuesday August $2^{nd}$ for the western business database—Tuesday version 222 that is hosted by the personal digital assistant 108.

The sixth data object is optionally determined to be based on a seventh data object and the third data object, block 328. By way of example and without limitation, this can include the backup/restore application 120 determining that the western business database—Tuesday version 222 evolved from both the western contacts database—Monday version 206 that is hosted by the western desktop computer 104 and the western accounts database—Monday version 214.

The sixth backup file is optionally de-duplicated based on the third backup file that was created for the third data object, the second backup file that was created for the second data object, and the seventh backup file that was created for the seventh data object, block 330. In embodiments, this can include the backup/restore application 120 de-duplicating the incremental backup file created at midnight on Tuesday August $2^{nd}$ for the western business database—Tuesday version 222 based on the incremental backup file created at midnight on Monday August $1^{st}$ for the western contacts database—Monday version 206, the full backup file for the contacts database 202, and the incremental backup file created at midnight on Monday August $1^{st}$ for the western accounts database—Monday version 214.

Although FIG. 3 depicts the blocks 302-330 occurring in a specific order, the blocks 302-330 may occur in another order. In other implementations, each of the blocks 302-330 may also be executed in combination with other blocks and/or some blocks may be divided into a different set of blocks.

Figure 4:
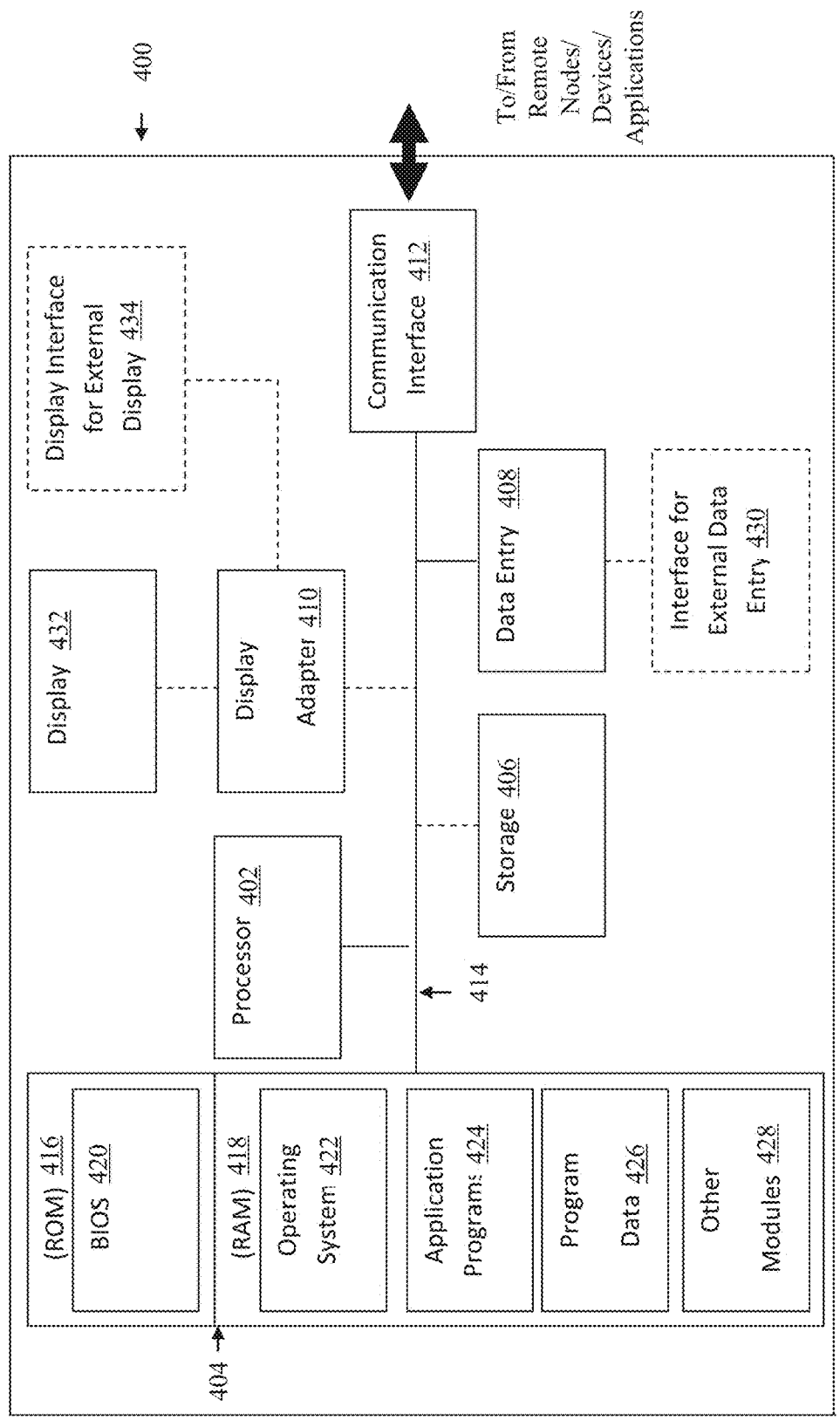
FIG. 4 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 4 may vary depending on the system implementation. With reference to FIG. 4, an exemplary system for implementing the subject matter disclosed herein includes a hardware device 400, including a processing unit 402, memory 404, storage 406, a data entry module 408, a display adapter 410, a communication interface 412, and a bus 414 that couples the elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in the memory 404 and/or the storage 406 and/or received via the data entry module 408.

The memory 404 may include read only memory (ROM) 416 and random access memory (RAM) 418. The memory 404 may be configured to store program instructions and data during operation of the hardware device 400. In various embodiments, the memory 404 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 404 may also include nonvolatile memory technologies such as nonvolatile flash RAM (NVRAM) or ROM. In some embodiments, it is contemplated that the memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in the ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 400.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 406, the ROM 416 or the RAM 418, including an operating system 422, one or more applications programs 424, program data 426, and other program modules 428. A user may enter commands and information into the hardware device 400 through the data entry module 408. The data entry module 408 may include mechanisms such as a keyboard, a touch screen, a pointing device, etc. Other external input devices (not shown) are connected to the hardware device 400 via an external data entry interface 430. By way of example and not limitation, external input devices may include a microphone, joystick, game pad, satellite dish, scanner, or the like. In some embodiments, external input devices may include video or audio input devices such as a video camera, a still camera, etc. The data entry module 408 may be configured to receive input from one or more users of the hardware device 400 and to deliver such input to the processing unit 402 and/or the memory 404 via the bus 414.

A display 432 is also connected to the bus 414 via the display adapter 410. The display 432 may be configured to display output of the hardware device 400 to one or more users. In some embodiments, a given device such as a touch screen, for example, may function as both the data entry module 408 and the display 432. External display devices may also be connected to the bus 414 via an external display interface 434. Other peripheral output devices, not shown, such as speakers and printers, may be connected to the hardware device 400.

The hardware device 400 may operate in a networked environment using logical connections to one or more remote nodes (not shown) via the communication interface 412. The remote node may be another computer, a server, a router, a peer device or other common network node, and typically includes many or all of the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 412 may include logic configured to support direct memory access (DMA) transfers between the memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 400 and other devices may be used.

It should be understood that the arrangement of the hardware device 400 illustrated in FIG. 4 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for de-duplicating backup files based on data evolution, the system comprising:
a processor-based application, which when executed on a computer, will cause the processor to:
determine that a first backup file is created for a first data object;
determine that the first data object is based on a second data object;
de-duplicate the first backup file based on a second backup file that was created for the second data object in response to the determination that the first data object is based on the second data object;
determine that a third backup file is created for a third data object;
determine that the third data object is based on the second data object; and
de-duplicate the third backup file based on the second backup file that was created for the second data object in response to the determination that the third data object is based on the second data object.

2. The system of claim 1, wherein determining that the first data object is based on the second data object comprises at least one of analyzing the first backup file and receiving information associating the first data object with the second data object.

3. The system of claim 1, wherein determining that the first data object is based on the second data object comprises creating a link from the first data object to the second data object in a data evolution structure, and de-duplicating the first backup file is based on the link from the first data object to the second data object.

4. The system of claim 1, wherein the first backup file comprises a first incremental backup file, the second backup file comprises a first full backup file, and the third backup file comprises a second incremental backup file.

5. The system of claim 1, wherein the processor-based application further causes the processor to:
determine that a fourth backup file is created for a fourth data object;
determine that the fourth data object is based on the first data object; and de-duplicate the fourth backup file based on the first backup file that was created for the first data object and the second backup file that was created for the second data object.

6. The system of claim 1, wherein the processor-based application further causes the processor to:
 determine that a fifth backup file is created for a fifth data object;
 determine that the fifth data object is based on the third data object; and
 de-duplicate the fifth backup file based on the third backup file that was created for the third data object and the second backup file that was created for the second data object.

7. The system of claim 6, wherein the processor-based application further causes the processor to:
 determine that a sixth backup file is created for a sixth data object;
 determine that the sixth data object is based on the third data object and a seventh data object; and
 de-duplicate the sixth backup file based on the third backup file that was created for the third data object, the second backup file that was created for the second data object, and a seventh backup file that was created for the seventh data object.

8. A computer-implemented method for de-duplicating backup files based on data evolution, the method comprising:
 determining that a first backup file is created for a first data object;
 determining that the first data object is based on a second data object;
 de-duplicating the first backup file based on a second backup file that was created for the second data object in response to the determination that the first data object is based on the second data object;
 determining that a third backup file is created for a third data object;
 determining that the third data object is based on the second data object; and
 de-duplicating the third backup file based on the second backup file that was created for the second data object in response to the determination that the third data object is based on the second data object.

9. The method of claim 8, wherein determining that the first data object is based on the second data object comprises at least one of analyzing the first backup file and receiving information associating the first data object with the second data object.

10. The method of claim 8, wherein determining that the first data object is based on the second data object comprises creating a link from the first data object to the second data object in a data evolution structure, and de-duplicating the first backup file is based on the link from the first data object to the second data object.

11. The method of claim 8, wherein the first backup file comprises a first incremental backup file, the second backup file comprises a first full backup file, and the third backup file comprises a second incremental backup file.

12. The method of claim 8, wherein the method further comprises:
 determining that a fourth backup file is created for a fourth data object;
 determining that the fourth data object is based on the first data object; and
 de-duplicating the fourth backup file based on the first backup file that was created for the first data object and the second backup file that was created for the second data object.

13. The method of claim 8, wherein the method further comprises:
 determining that a fifth backup file is created for a fifth data object;
 determining that the fifth data object is based on the third data object; and
 de-duplicating the fifth backup file based on the third backup file that was created for the third data object and the second backup file that was created for the second data object.

14. The method of claim 13, wherein the method further comprises:
 determining that a sixth backup file is created for a sixth data object;
 determining that the sixth data object is based on the third data object and a seventh data object; and
 de-duplicating the sixth backup file based on the third backup file that was created for the third data object, the second backup file that was created for the second data object, and a seventh backup file that was created for the seventh data object.

15. A computer program product, comprising a non-transitory computer-readable medium having a computer-readable program code embodied therein to be executed by one or more processors, the program code including instructions to:
 determine that a first backup file is created for a first data object;
 determine that the first data object is based on a second data object;
 de-duplicate the first backup file based on a second backup file that was created for the second data object in response to the determination that the first data object is based on the second data object;
 determine that a third backup file is created for a third data object;
 determine that the third data object is based on the second data object; and de-duplicate the third backup file based on the second backup file that was created for the second data object in response to the determination that the third data object is based on the second data object.

16. The computer program product of claim 15, wherein determining that the first data object is based on the second data object comprises at least one of analyzing the first backup file and receiving information associating the first data object with the second data object.

17. The computer program product of claim 15, wherein determining that the first data object is based on the second data object comprises creating a link from the first data object to the second data object in a data evolution structure, and de-duplicating the first backup file is based on the link from the first data object to the second data object.

18. The computer program product of claim 15, wherein the first backup file comprises a first incremental backup file, the second backup file comprises a first full backup file, and the third backup file comprises a second incremental backup file.

19. The computer program product of claim 15, wherein the wherein the program code includes further instructions to:
 determine that a fourth backup file is created for a fourth data object;

determine that the fourth data object is based on the first data object; and de-duplicate the fourth backup file based on the first backup file that was created for the first data object and the second backup file that was created for the second data object.

20. The computer program product of claim 15, wherein the wherein the program code includes further instructions to:

determine that a fifth backup file is created for a fifth data object;

determine that the fifth data object is based on the third data object;

de-duplicate the fifth backup file based on the third backup file that was created for the third data object and the second backup file that was created for the second data object;

determine that a sixth backup file is created for a sixth data object;

determine that the sixth data object is based on the third data object and a seventh data object; and de-duplicate the sixth backup file based on the third backup file that was created for the third data object, the second backup file that was created for the second data object, and a seventh backup file that was created for the seventh data object.

* * * * *